E. Bangs,
Jib Hank.
No. 99,623. Patented Feb. 8, 1870.

Witnesses  Elijah Bangs
                by his attorney

United States Patent Office.

ELIJAH BANGS, OF PROVINCETOWN, MASSACHUSETTS.

Letters Patent No. 99,623, dated February 8, 1870.

IMPROVEMENT IN CHAIN-SHACKLES.

The Schedule referred to in these Letters Patent and making part of the same

*To all persons to whom these presents may come:*

Be it known that I, ELIJAH BANGS, of Provincetown, of the county of Barnstable, and State of Massachusetts, have invented a new and useful Improvement in Chain-Shackles; and do hereby declare the same to be fully described in the following specification, and represented in the accompanying drawings, of which—

Figure 1:
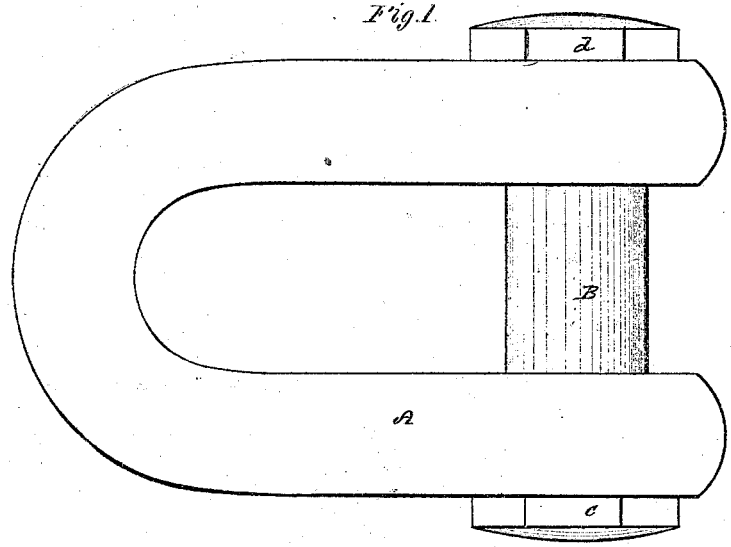

Figure 1 is a front elevation, and

Figure 2:
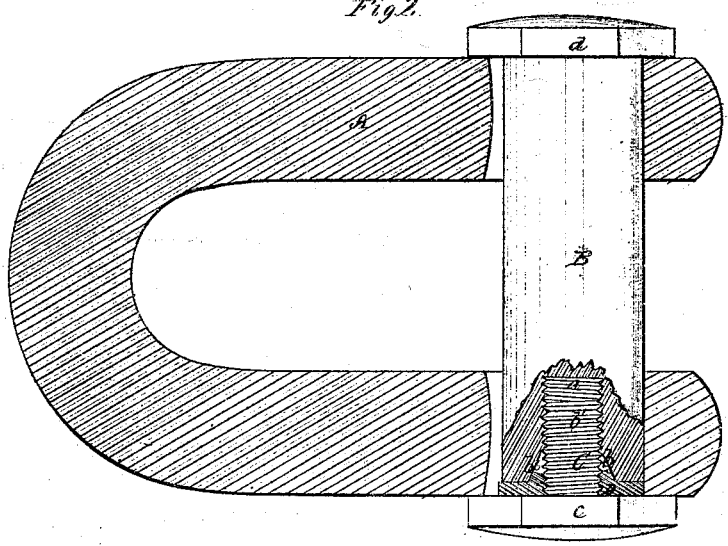

Figure 2, a longitudinal section of one of my improved shackles.

The common chain-shackle usually has the bolt of its bowed link held in place on the link, by means of a key inserted through a slot made transversely through the bolt. This key is liable to become rusted or oxidized by sea-water or exposure, so as to render it difficult to remove it from the bolt in cases of emergency, and besides, the necessary extension of the bolt, to receive the key, causes the bolt and the key to project so much beyond the link, as to be in the way, or be liable to be caught against objects, and broken or injured while the shackle may be in use.

The objection to the employment of a screw and nut to hold the bolt in place, (the thread of the screw being cut on the bolt,) has been, that the bolt and screw are liable to become oxidated and set together.

I have made an improvement which not only enables the key to be dispensed with, and the advantages of the nut and screw to be secured, but obviates the danger of oxidation of the screws, and their adhesion, my said improvement causing the threads of the screws to be wholly out of the influence of sea-water, and to be preserved in their normal condition.

In carrying out my invention, I socket the lower end of the bolt B of the bowed link A, (see figs. 1 and 2 of the drawings,) and form in it a female screw, $a$, having a countersink or conical mouth, $b$, and with such screw I employ a short or auxiliary bolt, C, consisting of a male screw, $b$, and a prismatic head, $c$, the latter corresponding in size and form to the head $d$ of the main bolt B.

Before screwing the screw $b$ into the female screw of the main bolt, I place on the screw $b$, so as to encompass it, a thick washer, D, of a water-proof and yielding or elastic material, such as India rubber, for instance, which, when the auxiliary bolt is set up into the main bolt, shall be forced into the conical mouth $b$, so as to be make a water-tight joint between the head of the auxiliary bolt and the next adjacent end of the main bolt.

The elastic expansible washer will also perform another important function. When it is expanded sufficiently into the eye $e$ of the link, as in this case, it will operate to prevent the shackle-bolt B from readily revolving in the eye, the latter serving as a protection to the washer.

What I claim as my invention or improvement may be stated as follows, viz:

The combination and arrangement of the auxiliary screw-bolt C and the elastic washer D, with the bowed link A of the chain-shackle, and with the main bolt B socketed and provided with a female screw, substantially as described.

ELIJAH BANGS.

Witnesses:
R. H. EDDY,
J. R. SNOW.